United States Patent
Matsuda

Patent Number: 5,814,727
Date of Patent: Sep. 29, 1998

[54] SEMICONDUCTOR ACCELEROMETER HAVING REDUCED SENSOR PLATE FLEXURE

[75] Inventor: Asher T. Matsuda, Scottsdale, Ariz.

[73] Assignee: Motorola, Inc., Schaumburg, Ill.

[21] Appl. No.: 148,307

[22] Filed: Nov. 8, 1993

[51] Int. Cl.6 .......................... G01P 15/13; G01P 15/125
[52] U.S. Cl. .................................. 73/514.17; 73/514.24; 73/514.32
[58] Field of Search .......................... 73/517 R, 517 AV, 73/517 B

[56] References Cited

U.S. PATENT DOCUMENTS

| 3,339,419 | 9/1967 | Wilcox. | |
|---|---|---|---|
| 4,656,383 | 4/1987 | Albert | 73/517 AV |
| 4,712,427 | 12/1987 | Peters | 73/517 AV |
| 4,930,042 | 5/1990 | Wiegard et al. | 73/517 AV |
| 4,945,765 | 8/1990 | Rozhart | 73/517 AV |
| 5,008,774 | 4/1991 | Bullis et al. | 73/517 R |
| 5,115,291 | 5/1992 | Stokes | 73/517 R |
| 5,176,031 | 1/1993 | Peters | 73/517 R |
| 5,220,835 | 6/1993 | Stephan | 73/517 R |
| 5,239,870 | 8/1993 | Kaneko | 73/517 R |
| 5,241,864 | 9/1993 | Addie et al. . | |

FOREIGN PATENT DOCUMENTS 0560661  5/1993  European Pat. Off. .

Primary Examiner—Herzon E. Williams
Assistant Examiner—Helen C. Kwok
Attorney, Agent, or Firm—Robert F. Hightower

[57] ABSTRACT

A semiconductor accelerometer is formed with a sensor plate that remains substantially planar when acceleration forces are applied. The sensor plate is supported by support beams that are attached to the sensor plate at constraint points. A portion of the mass of the sensor element is cantilevered outward past the constraint points. During the application of acceleration forces, the cantilevered mass creates a counterbalancing moment that maintains the sensor plate in a substantially planar state.

20 Claims, 2 Drawing Sheets

SEMICONDUCTOR ACCELEROMETER HAVING REDUCED SENSOR PLATE FLEXURE

BACKGROUND OF THE INVENTION

The present invention relates, in general, to semiconductors, and more particularly, to semiconductor accelerometers.

In the past, the semiconductor industry has utilized a variety of structures and methods in forming semiconductor accelerometers. One class of prior accelerometers utilizes two series capacitors having two fixed parallel plates and a movable planar sensor element suspended between the two fixed plates. The sensor element forms a third plate that is common to both capacitors. As acceleration forces cause the sensor element to move closer to one of the fixed capacitor plates, the capacitance value of the accelerometer varies. External electronics coupled to the accelerometer detect the change in capacitance value. One disadvantage of such prior semiconductor accelerometers is the attainable accuracy. Typically, the acceleration forces not only cause the sensor element to move but also cause the center portion of the sensor element to flex or sag so that the sensor element is no longer planar. The flexure causes one portion of the sensor element to be closer to one capacitor plate than other portions of the sensor element, thus, the capacitance variation is no longer linearly related to the force applied to the accelerometer. Additionally, the flexure or sagging reduces the distance between the sensor element and the capacitor plates. Often the plate to sensor element distance is small enough to allow electrostatic attraction forces to force the sensor element against the capacitor plate thereby electrically shorting the accelerometer.

Accordingly, it is desirable to have a semiconductor accelerometer sensor element that does not flex in response to acceleration forces, and that has a substantially linear relationship between capacitance value and applied acceleration force.

DETAILED DESCRIPTION OF THE DRAWINGS

Figure 1:
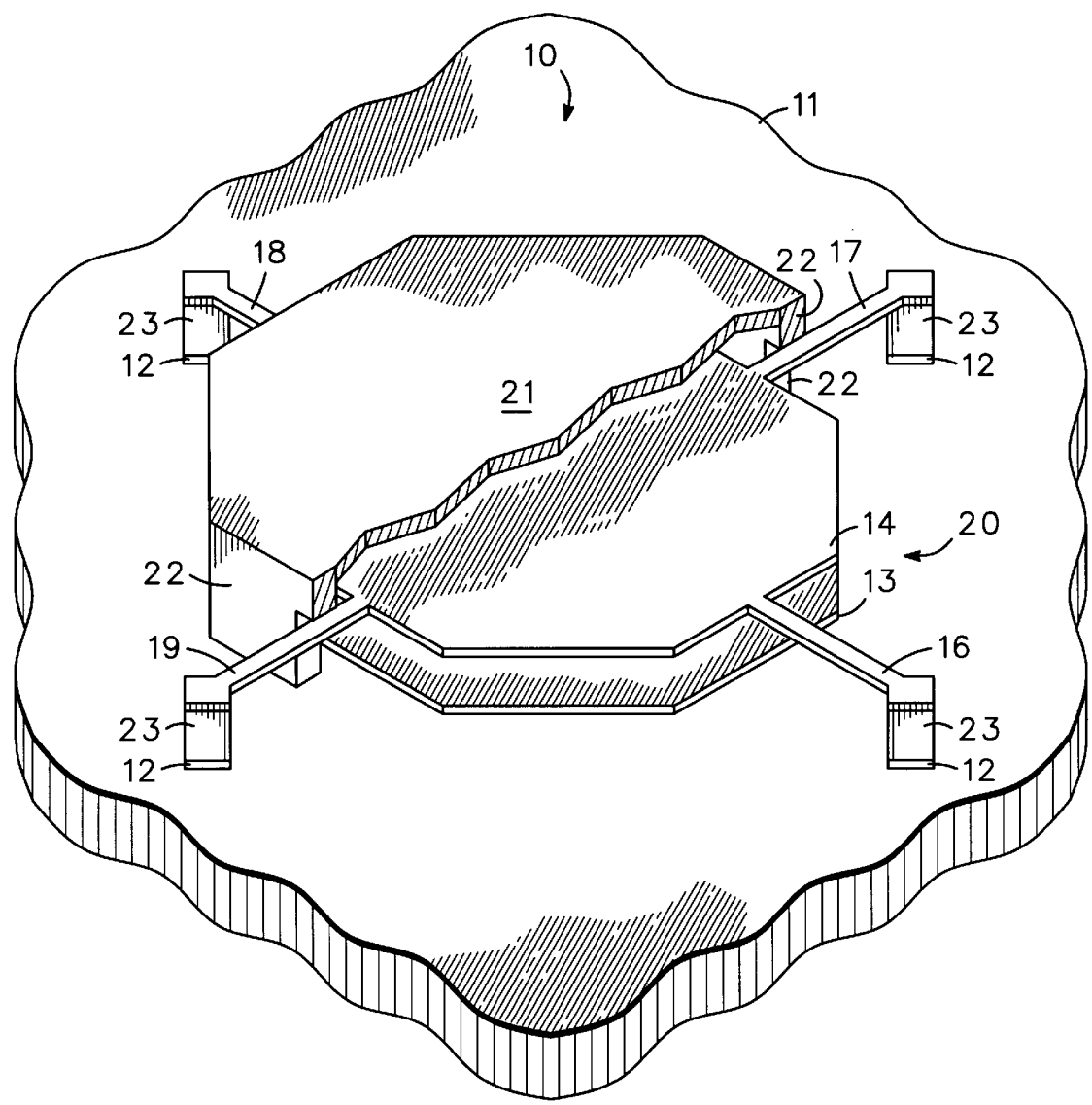
FIG. 1 illustrates an enlarged cut-away perspective view of a semiconductor accelerometer in accordance with the present invention.

FIG. 1 illustrates an enlarged cut-away perspective view of a semiconductor accelerometer 10. Accelerometer 10 includes a first capacitor plate 13 that is formed on a substrate 11, and a second capacitor plate 21 overlying plate 13. Plate 21 is suspended above plate 13 by a plurality of walls 22 that extend from the sides of plate 21 to the surface of substrate 11. A plurality of support beams 16, 17, 18, and 19 suspend a sensor plate 14 between capacitor plates 13 and 21. Plate 14 and beams 16, 17, 18, and 19 function as a sensor element 20. A first end of beams 16, 17, 18, and 19 is attached to the sides of plate 14 while a distal end of each beam 16, 17, 18, and 19 has a support column 23 that extends toward the surface of substrate 11. In the preferred embodiment, column 23 extends substantially perpendicularly from beams 16, 17, 18, and 19. Column 23 rests on a support area 12 in order to distribute the force applied to column 23 across substrate 11. With no force applied, plate 14 is suspended substantially coplanarly approximately midway between plates 13 and 21. As will be seen hereinafter, acceleration forces cause plate 14 to move substantially coplanarly and normal to plates 13 and 21.

Plates 21 and 14 form a first capacitor while plates 13 and 14 form a second capacitor in series with the first capacitor. Plates 13, 14, and 21 are electrically connected to electronics (not shown) that monitor the value of the two capacitors. The electronics can be formed in substrate 11 or can be external.

Accelerometer 10 can be formed from a variety of semiconductor materials and techniques that are well known to those skilled in the art. Substrate 11 can be a variety of materials including semiconductor materials such as silicon. Also, substrate 11 may have a surface layer of silicon nitride or other material in order to support accelerometer 10. One example of such materials and techniques is described in U.S. Pat. No. 5,241,864 issued to Addie et al on Sep. 7, 1993. In the preferred embodiment, support areas 12, walls 22, and plates 13 and 21 are formed from polysilicon. The preferred embodiment of plate 14, columns 23, and beams 16, 17, 18, and 19 is a multi-layer structure comprising a layer of silicon nitride sandwiched between two layers of polysilicon.

Figure 2:
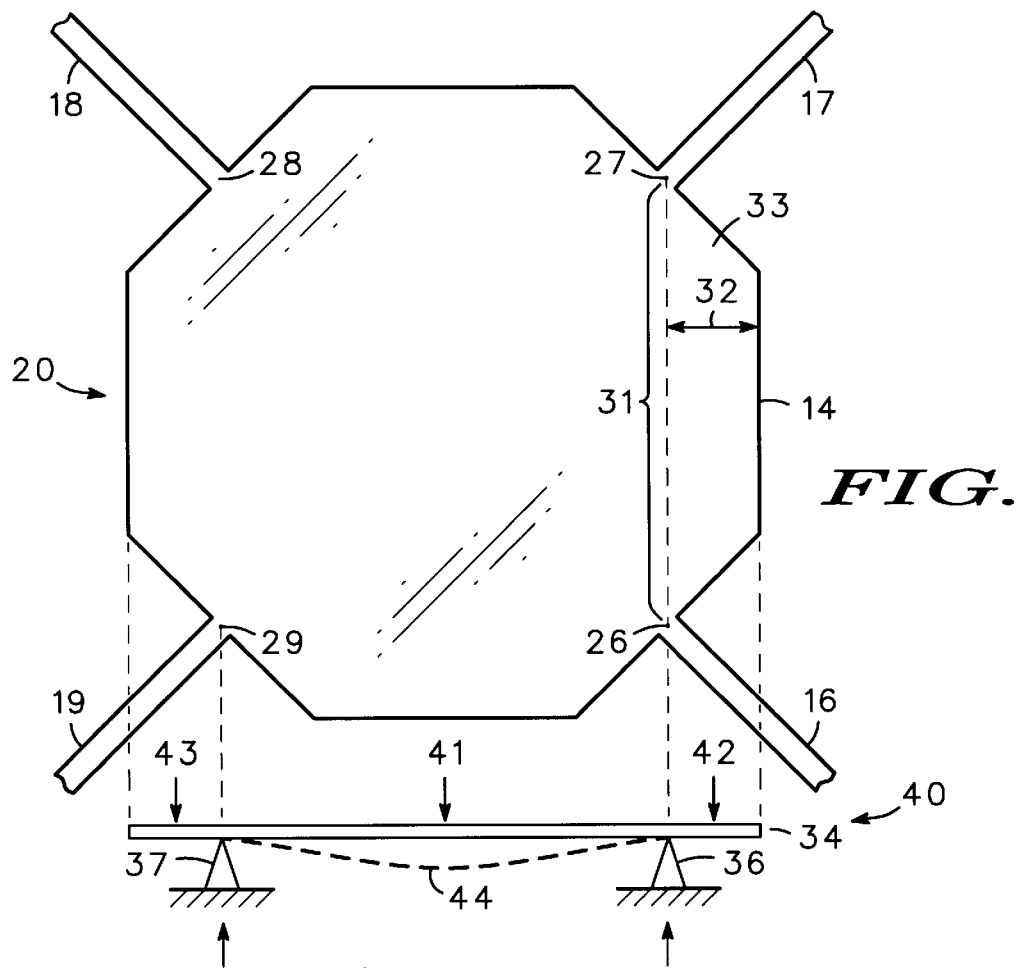
FIG. 2 illustrates a portion of a sensor element of the accelerometer of FIG. 1 in accordance with the present invention.

FIG. 2 illustrates a plan view of a portion of sensor element 20, described in FIG. 1. FIG. 2 also includes a force diagram 40 illustrating an example of acceleration forces applied to plate 14. Elements of FIG. 2 that are the same as FIG. 1 have the same reference numerals. Plate 14 has a plurality of constraint points 26, 27, 28, and 29 located where beams 16, 17, 18, and 19, respectively, intersect the sides of plate 14. Constraint points 26, 27, 28, and 29 support the mass of plate 14 and function to hold plate 14 substantially coplanar to plates 13 and 21 (FIG. 1). As shown by an arrow 32, the total mass of plate 14 includes a central mass that includes the central portion of plate 14 bounded by constraint points 26, 27, 28, and 29, and a cantilevered mass 33 that is cantilevered outside of constraint points 26 and 27. A dashed line 31 between constraint points 26 and 27 illustrates the supported end of mass 33, and the outside edge of plate 14 represents the free end. Similar cantilevered masses lie between constraint points 27 and 28, 28 and 29, and 29 and 26.

As acceleration forces are applied to plate 14, these cantilevered masses create a counterbalancing moment along the edges of plate 14. The counterbalancing moment tends to restore the center of plate 14 to a planar or parallel condition thereby improving the accuracy of sensor 10 (FIG. 1). This counter balancing moment is illustrated by diagram 40. Plate 14 is illustrated in diagram 40 by an element 34. Fulcrum points 36 and 37 represent the effects of constraint points 26 and 29, respectively. For simplicity of the explanation, only two constraint points are shown in diagram 40, however, the explanation applies to all the cantilevered masses of plate 14. Arrows 41, 42, and 43 represent an acceleration force applied to plate 14. The portion of the force that acts on the center of plate 14, represented by arrow 41, tends to flex or displace the center of plate 14 from its planar condition. This flexure is illustrated by a dashed line 44. The forces applied to the cantilevered mass, represented by arrows 42 and 43, also apply a downward force to the respective cantilevered portions of plate 14. However, fulcrum points 36 and 37 translate the downward force of arrows 42 and 43, respectively, into a counterbalancing moment about each of fulcrums 36 and 37, respectively, that tends to restore the center portion of plate 14 to a substantially planar state. By maintaining plate 14 in the substantially planar condition, the cantilevered mass facilitates forming a substantially linear relationship between the acceleration force and the capacitance variation of accelerometer 10 (FIG. 1).

Sensor plate 14 is not limited to an octagonal shape, but can have a variety of shapes and configurations as long as a portion of the mass is cantilevered outboard or outward from the constraint points. Suitable shapes include a circle, a triangle, or other polygon.

The percent of the total mass that is cantilevered depends on the shape of plate 14. If the cantilevered mass is too large, plate 14 will tilt to one side instead of remaining planar during acceleration. In order to maintain coplanarity, the total cantilevered mass can vary from approximately ten percent to approximately eighty percent of the total mass of plate 14. In the preferred embodiment, each cantilevered mass is approximately sixteen percent of the total mass of plate 14 resulting in a total cantilevered mass of approximately sixty four percent. The sixteen percent cantilevered mass reduces flexure at the center of plate 14 by approximately fifty percent.

Figure 3:
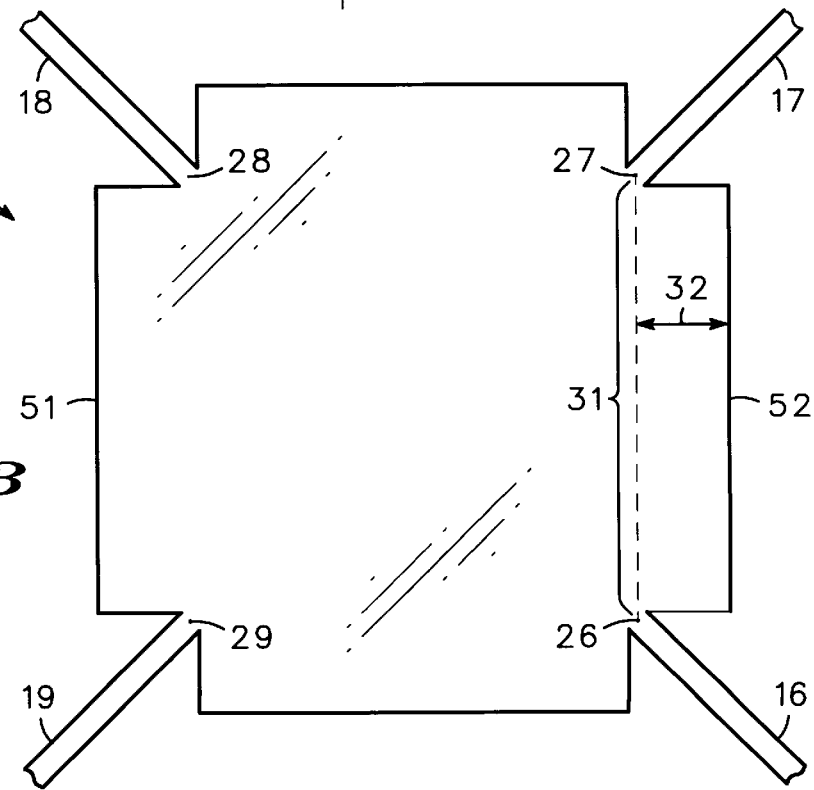
FIG. 3 illustrates an alternate embodiment of a sensor plate in accordance with the present invention.

FIG. 3 illustrates an alternate embodiment of a sensor element 50 that is suitable for use in a semiconductor accelerometer such as accelerometer 10 of FIG. 1. Portions of FIG. 3 that are the same as FIG. 2 have the same reference numerals. Element 50 includes a substantially square sensor plate 51 supported by beams 16, 17, 18, and 19 at constraint points 26, 27, 28, and 29, respectively. Element 50 also includes a cantilevered mass 52 extending outward from constraint points 26 and 27 as illustrated by arrow 32. Mass 52 creates a counterbalancing moment, similar to the counterbalancing moment explained in the description of FIG. 2, that maintains plate 51 in a substantially planar condition.

By now it should be appreciated that there has been provided a novel way of forming a semiconductor accelerometer. Cantilevering a portion of the plate's mass outside of the constraint points facilitates forming a counterbalancing moment that maintains the sensor plate substantially planar as acceleration forces are applied to the accelerometer.

I claim:

1. A planar semiconductor accelerometer sensor plate comprising:
   a first mass of the sensor plate bounded by a plurality of constraint points, wherein the first mass is disposed inside the plurality of constraint points; and
   a second mass of the sensor plate cantilevered from the first mass in order to produce a counterbalancing moment on the first mass, wherein the second mass is disposed outside the plurality of constraint points for restoring the sensor plate to a substantially planar condition in response to acceleration forces.

2. The semiconductor accelerometer of claim 1 wherein the second mass is cantilevered from the first mass by at least two of the plurality of constraint points.

3. The semiconductor accelerometer of claim 1 wherein the sensor plate is substantially planar.

4. The semiconductor accelerometer of claim 1 wherein the sensor plate is suspended substantially coplanar to a pair of capacitor plates.

5. The semiconductor accelerometer of claim 1 wherein the second mass is between approximately 10 and 80 percent of a total mass of the sensor plate.

6. The semiconductor accelerometer of claim 1 wherein the sensor plate has an octagonal shape.

7. The semiconductor accelerometer of claim 1 wherein the sensor plate has a square shape.

8. A semiconductor accelerometer comprising:
   a semiconductor substrate having a surface;
   a first capacitor plate on the surface of the semiconductor substrate;
   a second capacitor plate overlying and spaced apart from the first capacitor plate; and
   a planar sensor plate having sides, a first mass, and a second mass wherein the second mass is cantilevered from the first mass in order to produce a counterbalancing moment on the first mass, wherein the first mass is bounded by a plurality of constraint points and disposed inside the plurality of constraint points, wherein the second mass is disposed outside the plurality of constraint points, and wherein the sensor plate is suspended at one or more of the plurality of constraint points so that the sensor plate is suspended between the first capacitor plate and the second capacitor plate.

9. The semiconductor accelerometer of claim 8 wherein the second mass is cantilevered from the first mass at two of the plurality of constraint points.

10. The semiconductor accelerometer of claim 8 further including a plurality of support beams each having an end attached to the sides of the sensor plate at one of the plurality of constraint points, the support beams extending radially from the sides.

11. The semiconductor accelerometer of claim 10 further including a support post at a distal end of each of the plurality of support beams.

12. The semiconductor accelerometer of claim 8 wherein the first capacitor plate and the second capacitor plate are each a layer of polysilicon.

13. The semiconductor accelerometer of claim 8 wherein the sensor plate is a layer of silicon nitride sandwiched between two layers of polysilicon.

14. The semiconductor accelerometer of claim 8 wherein the sensor plate is suspended substantially coplanar to the first capacitor plate and to the second capacitor plate.

15. The semiconductor accelerometer of claim 8 wherein the second mass is between approximately 10 and 80 percent of a total mass of the sensor plate.

16. The semiconductor accelerometer of claim 8 wherein the sensor plate has an octagonal shape.

17. The semiconductor accelerometer of claim 8 wherein the sensor plate has a square shape.

18. A method of forming a semiconductor accelerometer comprising:
   forming a planar sensor plate having a plurality of constraint points for supporting a first mass of the sensor plate, wherein the first mass is bounded by and disposed inside the plurality of constraint points; and
   cantilevering a second mass of the sensor plate outward from at least two of the plurality of constraint points for restoring the sensor plate to a substantially planar condition in response to acceleration forces, wherein the second mass is disposed outside the plurality of constraint points.

19. The method of claim 18 wherein forming the sensor plate includes forming a planar octagonal shaped polysilicon sensor plate.

20. The method of claim 18 wherein the second mass is between approximately 10 to 80 percent of a total mass of the sensor plate.

* * * * *